Patented July 17, 1951

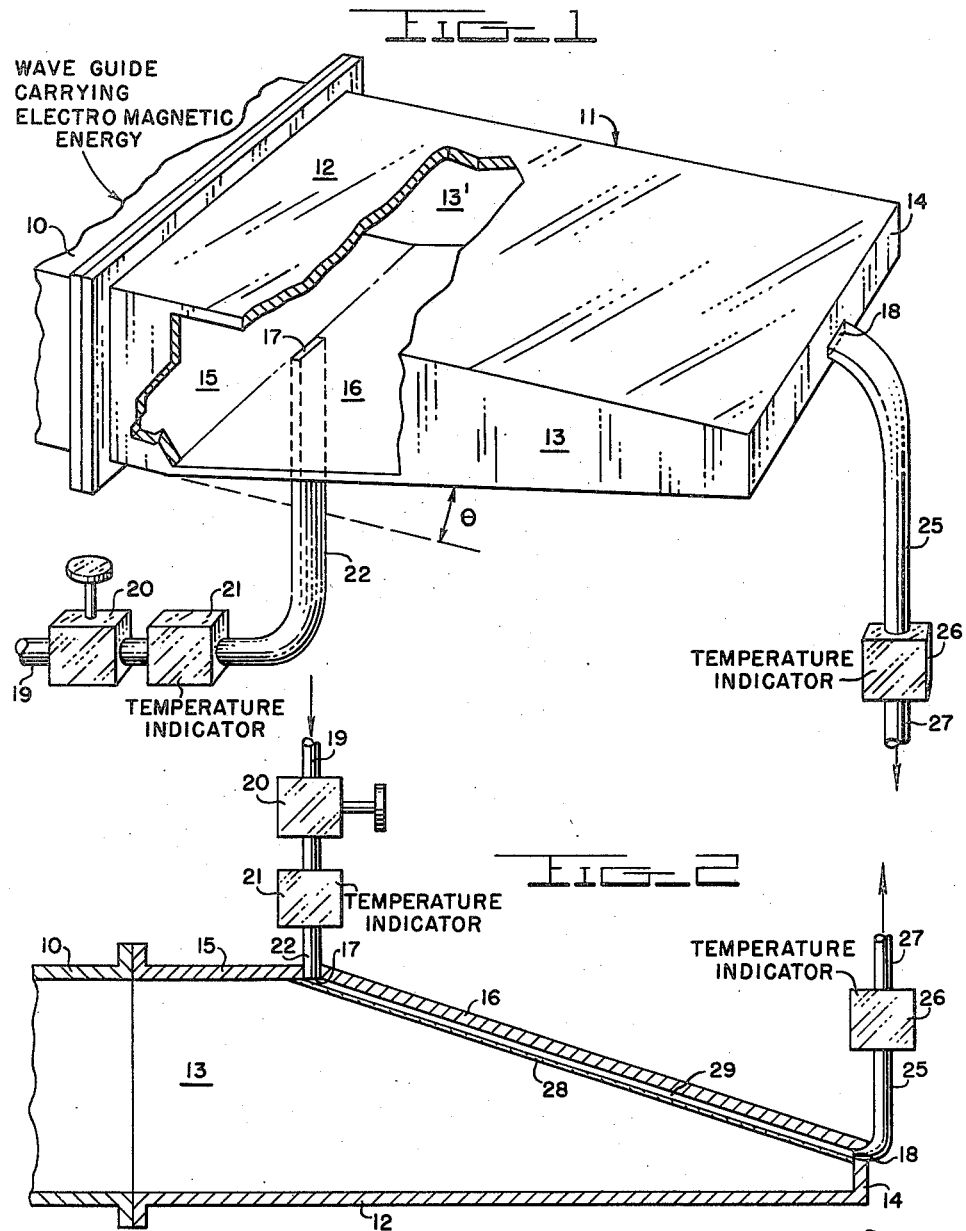

2,560,536

UNITED STATES PATENT OFFICE 2,560,536

HIGH-FREQUENCY POWER MEASURING DEVICE, INCLUDING A WATER LOAD

Charles F. Althouse, San Diego, Calif.

Application March 23, 1948, Serial No. 16,601

3 Claims. (Cl. 171—95)

(Granted under the act of March 3, 1883, as amended April 30, 1928; 370 O. G. 757)

This invention relates to power measuring devices and more particularly to a device for measuring the power of electromagnetic energy.

Devices have been provided heretofore for measuring the power of electromagnetic energy. One of such devices takes the form of a water load termination and includes a predetermined length of hollow wave guide energized by electromagnetic energy the power of which is to be measured. The wave guide is closed at one end with a metal plate positioned perpendicular to the longitudinal axis thereof and is tilted a predetermined angle about the closed end. The wave guide is filled with water to such a depth that the metal plate is completely covered thereby, and the predetermined angle of tilt is selected to establish an angle between the electric vector of the energizing electromagnetic energy and the water surface for substantially zero energy reflection. Water is circulated through the wave guide at a known rate and the temperature differential between the water input and output is measured as a function of power. This form of power measuring device does not provide accurate measurements when the electromagnetic energy to be measured is of high power and at ultra high frequencies and is operable only throughout a narrow frequency band substantially less than the frequency range of the wave guide. The large volume of water included in the foregoing device produces a comparatively large thermal lag in the indications obtained therefrom as well as increasing the conduction, convection and radiation losses inherent in such devices.

It is therefore an object of the present invention to provide novel means for measuring the power of electromagnetic energy.

Another object is to provide novel means for measuring the power of electromagnetic energy throughout a wide range of frequencies.

Another object is to provide a novel termination for mechanical transmission mediums capable of measuring high power electromagnetic energy with substantially absolute accuracy.

Another object is to provide a novel termination for wave guides capable of providing a low standing wave termination throughout the frequency range of the wave guides.

Another object is to provide a novel water load termination for wave guides capable of measuring high power radio frequency energy with absolute accuracy and so characterized as to provide a low standing wave ratio termination throughout a wide range of frequencies.

Still another object of the present invention is to provide a novel load termination, including an energy absorbing fluid, for mechanical transmission mediums, such as wave guides, capable of providing indications of power without substantial thermal lag.

Still another object is to provide a novel load termination including an energy absorbing fluid for measuring high frequency power so characterized as to reduce conduction, convection and radiation losses to a minimum.

A still further object of the present invention is to provide a novel load termination including an energy absorbing fluid for measuring high power electromagnetic energy designed in such a manner as to allow operation thereof in any desired position without affecting accuracy of the measurements provided thereby.

Other objects and features of the present invention will appear more fully hereinafter upon consideration of the following detailed description in connection with the accompanying drawing which discloses several embodiments of the invention. It is to be expressly understood however that the drawing is designed for purposes of illustration only and not as a definition of the limits of the invention, reference for the latter purpose being had to the appended claims.

In the drawing, wherein similar reference characters denote similar elements throughout the several views:

Fig. 1 is a perspective view, partly in section, of a load termination constructed in accordance with the principles of the present invention, and Fig. 2 is a sectional illustration of another embodiment of the present invention.

In accordance with the principles of the present invention, a wave guide structure of predetermined length is provided for energization by electromagnetic energy the power of which is to be measured. The wave guide structure includes a closed end and a surface inclined at a predetermined angle with respect to the longitudinal axis of the wave guide structure, such as, for example, at a predetermined angle with respect to the electric vector of energizing electromagnetic energy transmitted in the electric mode. Means are provided for establishing a constant flow of any suitable fluid possessing electromagnetic energy absorbing characteristics, such as water, over inner side of the inclined surface. The surface is inclined at such a predetermined angle so that a good termination is provided and the fluid film substantially completely absorbs the energizing electromagnetic energy. Means are also provided for measuring temperature variations of the fluid as a function of electromagnetic power absorbed thereby.

With reference to Fig. 1 of the drawing, a load termination constructed in accordance with the principles of the present invention is disclosed therein coupled to a hollow wave guide 10 of rectangular cross-section carrying electromagnetic energy the power of which is to be measured. Although a hollow wave guide having a rectangular cross-section is disclosed, it is to be expressly understood that any conventional type of mechanical transmission medium capable of efficiently transmitting electromagnetic energy, such as high, very high and ultra high radio frequency energy, may be utilized in connection with the present invention by employing appropriate coupling means. The load termination includes a wave guide section 11 coupled to the wave guide 10 in any conventional manner. The wave guide section 11 includes top portion 12 and side portions 13 and 13' as viewed in the drawing, extending from corresponding elements of the wave guide 10 in substantial conformance with the configurations thereof, and terminating in an end plate 14. The wave guide section 11 further includes a bottom portion 15, parallel to the top portion 12, and an inclined portion 16 extending toward the end plate 14 at a predetermined angle $\theta$ with respect to the longitudinal axis of the section 11. A fluid inlet port 17 is symmetrically provided at the end of the inclined portion 16 adjacent the bottom portion 15, and a fluid outlet port 18 is included at the opposite end of the inclined portion 16 at an intermediate point in the end plate 14. By means of apparatus that will be described more fully hereinafter a constant flow of electromagnetic energy absorbing fluid, such as water, of film thickness, is maintained over the inner surface of the inclined portion 16 by controlling the fluid supply to the inlet port 17 and by tilting the section 11 to allow fluid flow toward the end plate 14. The angle of inclination $\theta$ of the inclined portion 16 is selected so that a low standing wave ratio termination is provided with a resulting substantially zero energy reflection from the wave guide section 11. Under such circumstances the electromagnetic energy is substantially completely absorbed by the film of energy absorbing fluid and the temperature of the latter is increased in proportion to the power thereof.

In order to measure the power absorbed as a function of fluid temperature the present invention provides means for determining the temperature differential between the fluid at the input port 17 and at the output port 18. As shown in Fig. 1, a conduit 19 is provided for supplying a source of energy absorbing fluid under predetermined pressure. Fluid supplied by the conduit 19 is fed through a manually operable control valve 20 and a temperature indicator 21, such as a thermocouple or a thermometer well, to the input port 17 by way of a conduit 22. The output port 18 is connected by way of a conduit 25 to a temperature indicator 26, which may be constructed similar to the indicator 21, and hence to a discharge conduit 27. The valve 20 is adjustable to establish a constant fluid discharge from the port 17 sufficient to maintain constant fluid flow, of film thickness, over substantially the entire inner area of the inclined surface 16, and of sufficient velocity to prevent a substantial increase in temperature of the wave guide section 11. The temperature differential between the temperature indicators 21 and 26 is therefore substantially in direct proportion to the power of the electromagnetic energy fed to the wave guide section 11.

Since the energy absorbing fluid comprises a thin film substantially no thermal lag exists in the indication obtained. Furthermore, the comparatively small volume of fluid employed within the section 11 and the high velocity transfer of such fluid therethrough tends to reduce a conduction, convection and radiation losses inherent in power measuring apparatus of the type provided heretofore.

As mentioned heretofore, the angle of inclination $\theta$ of the portion 16 is established to maintain substantially zero energy reflection. It is to be expressly understood that the angle of inclination $\theta$ as well as other physical characteristics at the wave guide section 11 are determined upon consideration of the characteristic of the energy absorbing fluid employed, and the frequency and mode of transmission of the electromagnetic energy applied. By way of example, as mentioned heretofore, when the wave guide 10 transmits energy in the electric mode a surface of the wave section 11 is inclined at a predetermined angle to form an angle of zero energy reflection between the electric vector of the applied energy and the film surface. Consequently, the structure disclosed in the drawing is designed for purposes of illustration only and the configurations of the termination are to be determined from the characteristics of the energy absorbing fluid employed, and from the frequency and mode of transmission of the energy.

The efficiency of the termination may be determined by utilizing any conventional standing wave ratio measuring means, such as a bolometer and cooperating slotted section in the wave guide 10.

The embodiment of the invention disclosed in Fig. 2 of the drawing includes the novel features of the load termination disclosed in Fig. 1 and is so characterized as to allow operation thereof in any desired position. As shown, a shield 28 constructed of a suitable material having substantially no electromagnetic energy absorbing properties, such as polystyrene, is positioned inside the termination in spaced relation with the inclined portion 16. The edges of the shield 28 are sealed to the side portions 13, 13', to the end plate 14 and to the bottom portion 15, to define a fluid-tight envelope 29 having communication with the input port 17 and the output port 18. The shield 28 functions to maintain the fluid film only in contact with the inner surface of the inclined portion 16 irrespective of positions of the wave guide section 11. This form of the invention is extremely advantageous in instances where it is inconvenient or impossible to position the wave guide section 11 in a manner disclosed in Fig. 1 of the drawing.

There is thus provided by the present invention a novel load termination for measuring the power of electromagnetic energy supplied by convention transmission mediums at various modes of transmission. The devices disclosed herein have broad frequency band characteristics and are capable of measuring high power electromagnetic energy, such as high, very high and ultra high radio frequencies, with an extremely high degree of accuracy. Indications of power are obtained free from a substantial thermal lag and only insignificantly affected by conduction, convection and radiation losses. Furthermore, the foregoing devices comprise terminations wherein substantially zero energy reflection is encountered. Moreover, the present invention also provides a water load termination having the foregoing characteristics, wherein operation thereof is not restricted to any predetermined position.

Although several embodiments of the present invention have been disclosed and described herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. A water load for measuring the power of electromagnetic energy comprising a hollow rectangular member of predetermined length having electromagnetic energy transmission characteristics, means applying electromagnetic energy to said member, said member including a surface inclined at a predetermined angle with respect to the electric vector of said energy, means establishing constant water flow within said member over said surface, said predetermined angle being equal to an angle establishing zero reflection between the electric vector of said energy and the surface of said water and means determining power of said energy as a function of temperature variations of said water.

2. In combination, a hollow wave guide carrying radio frequency energy, a termination for said guide comprising a closed extension of said wave guide including a surface inclined at a predetermined angle with respect to the longitudinal axis thereof, means establishing constant flow of radio frequency energy absorbing fluid over said surface, said predetermined angle being equal to an angle establishing substantially zero energy reflection between the electric vector of said energy and said fluid and means measuring the power of said energy as a function of temperature variations of said fluid.

3. In combination, a hollow wave guide carrying radio frequency energy, a termination for said guide comprising a closed extension of said wave guide including a surface inclined at a predetermined angle with respect to the longitudinal axis thereof, means establishing constant water flow over said surface, said predetermined angle being equal to an angle establishing an angle between the electric vector of said energy and the surface of said water for zero energy reflection and means measuring the power of said energy as a function of temperature variations of said water.

CHARLES F. ALTHOUSE.

REFERENCES CITED

The following references are of record in the file of this patent:

UNITED STATES PATENTS

| Number | Name | Date |
| --- | --- | --- |
| 2,399,645 | Latimer | May 7, 1946 |
| 2,400,777 | Okress | May 21, 1946 |
| 2,409,599 | Tiley | Oct. 15, 1946 |
| 2,427,094 | Evans | Sept. 9, 1947 |
| 2,427,098 | Keizer | Sept. 9, 1947 |
| 2,458,579 | Feldman | Jan. 11, 1949 |
| 2,477,347 | Posey | July 26, 1949 |